(12) United States Patent
Achlioptas et al.

(10) Patent No.: US 7,493,297 B2
(45) Date of Patent: *Feb. 17, 2009

(54) METHODS AND SYSTEMS FOR COMPUTING SINGULAR VALUE DECOMPOSITIONS OF MATRICES AND LOW RANK APPROXIMATIONS OF MATRICES

(75) Inventors: Dimitris Achlioptas, Seattle, WA (US); Frank D. McSherry, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

This patent is subject to a terminal disclaimer.

(21) Appl. No.: 10/944,142

(22) Filed: Sep. 17, 2004

(65) Prior Publication Data

US 2005/0033708 A1 Feb. 10, 2005

Related U.S. Application Data

(63) Continuation of application No. 10/003,031, filed on Nov. 15, 2001, now Pat. No. 6,807,536.

(60) Provisional application No. 60/249,651, filed on Nov. 16, 2000.

(51) Int. Cl.
*G06F 17/00* (2006.01)
*G06N 5/02* (2006.01)

(52) U.S. Cl. ............... 706/46; 706/45; 706/14
(58) Field of Classification Search ............ None
See application file for complete search history.

(56) References Cited

U.S. PATENT DOCUMENTS

| | | | |
|---|---|---|---|
| 5,348,020 A | | 9/1994 | Hutson |
| 5,474,078 A * | | 12/1995 | Hutson ............... 600/512 |
| 5,517,115 A * | | 5/1996 | Prammer ............. 324/303 |
| 5,548,798 A * | | 8/1996 | King ................... 710/68 |
| 5,559,940 A * | | 9/1996 | Hutson ............... 715/526 |
| 5,612,783 A | | 3/1997 | Hirsh |
| 5,615,288 A * | | 3/1997 | Koshi et al. ........... 382/248 |
| 5,761,685 A * | | 6/1998 | Hutson ............... 715/526 |
| 6,064,808 A | | 5/2000 | Kapur et al. |
| 6,138,116 A * | | 10/2000 | Kitagawa et al. ........ 707/5 |
| 6,591,230 B1 * | | 7/2003 | Ding et al. ............ 702/189 |
| 6,594,622 B2 * | | 7/2003 | Srivastava ............ 702/189 |

(Continued)

FOREIGN PATENT DOCUMENTS

WO    WO9530981    11/1995

OTHER PUBLICATIONS

Joseph R. Cavallaro et al., Floating-Point CORDIC for Matrix Computation, 1988, IEEE, CH2643-5/88/0000/0040, 40-42.*

(Continued)

*Primary Examiner*—Joseph P Hirl
(74) *Attorney, Agent, or Firm*—Lee & Hayes, PLLC

(57) ABSTRACT

Methods and systems for finding a low rank approximation for an m×n matrix A are described. The described embodiments can independently sample and/or quantize the entries of an input matrix A, and can thus speed up computation by reducing the number of non-zero entries and/or their representation length. The embodiments can be used in connection with Singular Value Decomposition techniques to greatly benefit the processing of high-dimensional data sets in terms of storage, transmission and computation.

25 Claims, 7 Drawing Sheets

U.S. PATENT DOCUMENTS

| | | | |
|---|---|---|---|
| 6,629,097 | B1 | 9/2003 | Keith |
| 6,807,536 | B2* | 10/2004 | Achlioptas et al. ............ 706/15 |
| 2004/0011220 | A1 | 1/2004 | Richard et al. |

OTHER PUBLICATIONS

Sau-Gee Chen et al., A New Efficient Algorithm for Singular Value Decomposition, 1999, IEEE, 0-7803-5471-0/99, V-523-V-526.*

Harry C. Andrews et al., Singular Value Decomposition (SVD) Image Coding, 1976, IEEE, Transactions on Communications, 425-432.*

Sengupta, et al., "Solving the SVD Updating Problem for Subspace Tracking on a Fixed Sized Linear Array of Processors", IEEE ICASSP, Apr. 1997.

P. Drineas et al., "Clustering in large graphs and matrices" 16 pages.

Frieze, Allan et al., "Fast Monte-Carolo Algorithms for finding low-rank approximations" Oct. 22, 1998, 15 pages.

Ferzalie et al., "Adaptive SVD Algorithm for Covariance Matrix Elgenstructure Computation," IEEE International Conference on Acoustics, Speech and Signal processing, Apr. 1990.

Chen et al., A New Efficient Algorithm for Singular Value Decomposition, IEEE International Symposium on Circuits ans Systems, 1999.

Shen-Fu Hsiao, Adaptive Jacobl Method for Parallel Singular Value Decomposition, IEEE ICASSP, May 1995.

Tufts et al., Rank Determination in Time-Series Analysis, IEEE ICASSP, Apr. 1994.

\* cited by examiner

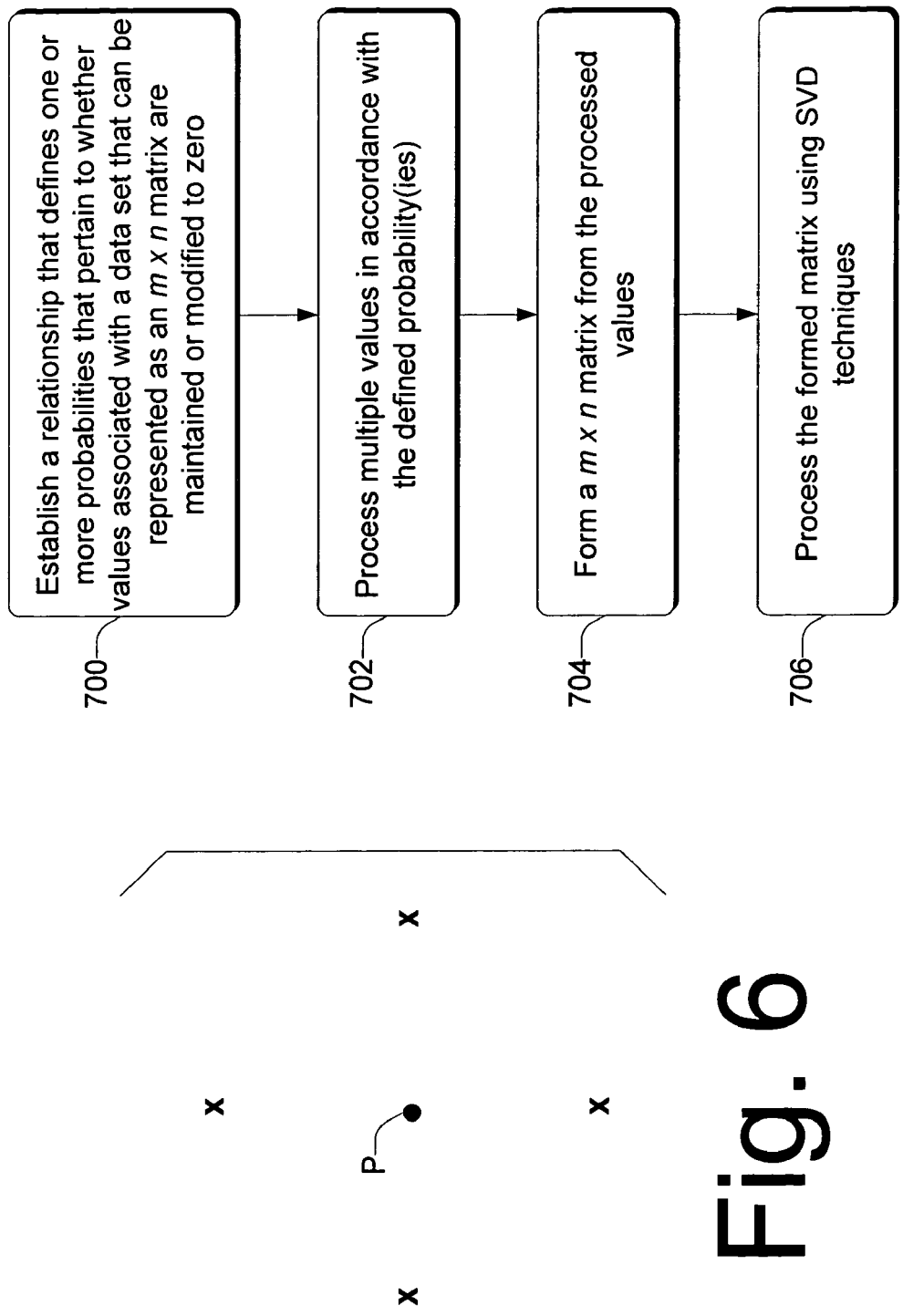

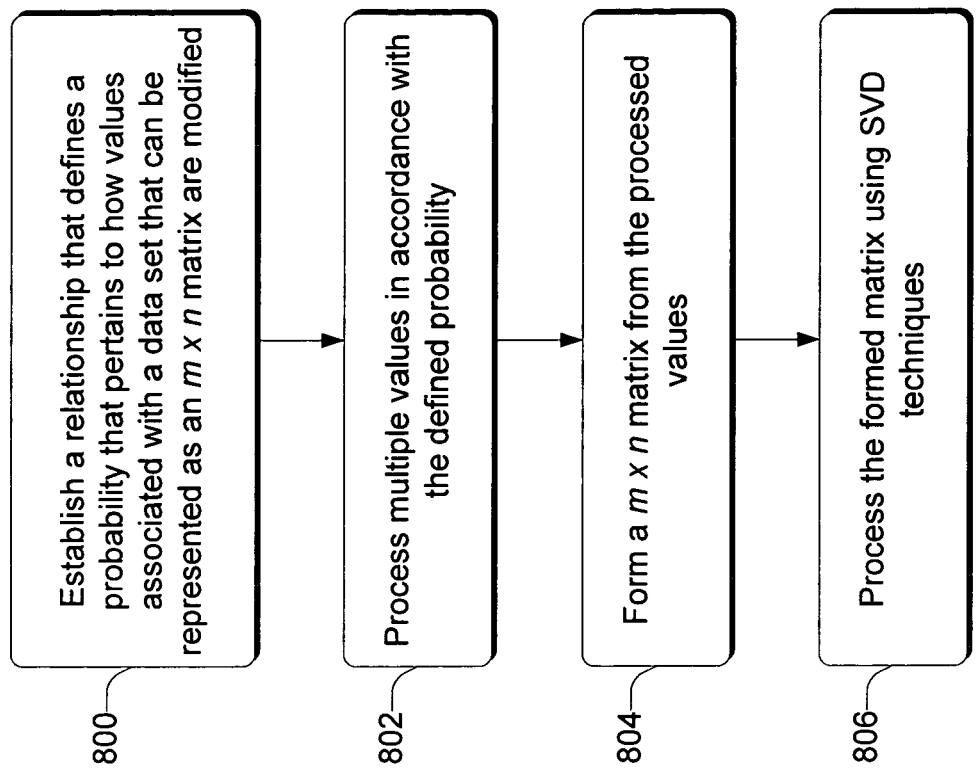

METHODS AND SYSTEMS FOR COMPUTING SINGULAR VALUE DECOMPOSITIONS OF MATRICES AND LOW RANK APPROXIMATIONS OF MATRICES

RELATED APPLICATIONS

This application is a continuation of and claims priority to U.S. Pat. No. 6,807,536 U.S. patent application Ser. No. 10/003,031, filed on Nov. 15, 2001, the disclosures of which are incorporated by reference. That application is related to and claims priority from U.S. Provisional Application Ser. No. 60/249,651, filed on Nov. 16, 2000, the disclosure of which is incorporated by reference.

TECHNICAL FIELD

This invention relates to methods and systems for computing Singular Value Decompositions of matrices and low rank approximations of matrices.

BACKGROUND

Many aspects of machine learning and data mining are affected by what has become known as "the curse of dimensionality". In order to find more sophisticated trends in data, potential correlations between larger and larger groups of variables must be considered. Unfortunately, the number of potential correlations generally increases exponentially with the number of input variables and, as a result, brute force approaches become infeasible.

A natural goal for machine learning is to attempt to identify and isolate these characteristic dimensions. We would like to simplify the data sufficiently so that we can apply traditional machine learning techniques, yet we do not wish to oversimplify, leaving out information crucial to understanding. A method widely used in this regard is to cast the data as a matrix A (indexed by <instance, attribute>) and compute a low rank approximation, D, of A. The idea is that the rank of a matrix corresponds roughly to the degrees of freedom of its entries. By constraining the rank of D we aim to capture the most pertinent characteristics of the data in A, leaving behind dimensions in which the data appears "random".

Such low rank approximations are most often derived by computing the Singular Value Decomposition of A and taking the rank k matrix, $A_k$, that corresponds to the k largest singular values.

Recall that for an arbitrary matrix A its Frobenius norm, $|A|_F$, is given by $$|A|_F = \sqrt{\sum_{i,j} A(i,j)^2}.$$

Perhaps the best-known property of $A_k$ is that for any rank k matrix D, $$|A-D|_F \geq |A-A_K|_F. \quad (1)$$

that is, $A_k$ is the optimal rank k approximation of matrix A, since every other rank k matrix D is "further" from A as measured by the Frobenius norm.

This method has met with significant empirical success in a number of different areas, including Latent Semantic Analysis (LSA) in Information Retrieval as described in Berry et al., *Matrices, Vector Spaces, and Information Retrieval*, SIAM Rev. 41 (1999) no. 2, 335-362 and Berry et al., *Using Linear Algebra for Intelligent Information Retrieval*, SIAM Rev. 37 (1995), no. 4, 573-595. This method has also met with significant empirical success in Face Recognition, as described in Turk et al., *Eigenfaces for Recognition*, Journal of Cognitive Neuroscience 3 (1991), no. 1, 71-86.

Accordingly, this invention arose out of concerns associated with providing improved methods and systems for processing data in high dimensional space and, in particular, for computing low rank approximations to matrices using the Singular Value Decomposition.

SUMMARY

Methods and systems for finding a low rank approximation for an m×n matrix A are described. The described embodiments can independently sample and/or quantize the entries of an input matrix A, and can thus speed up computation by reducing the number of non-zero entries and/or their representation length. The embodiments can be used in connection with Singular Value Decomposition techniques to greatly benefit the processing of high-dimensional data sets in terms of storage, transmission and computation.

BRIEF DESCRIPTION OF THE DRAWINGS

FIG. 6 is a diagram that is useful in understanding perturbation aspects of the described embodiments.

FIG. 7 is a flow diagram that describes steps in a method in accordance with one embodiment.

FIG. 8 is a flow diagram that describes steps in a method in accordance with one embodiment.

DETAILED DESCRIPTION

Overview

Methods and systems for finding a low rank approximation for an m×n matrix A are described. The described embodiments can independently sample and/or quantize the entries of an input matrix A, and can thus speed up computation by reducing the number of non-zero entries and/or their representation length. The embodiments can be used in connection with Singular Value Decomposition techniques to greatly benefit the processing of high-dimensional data sets in terms of storage, transmission and computation.

Exemplary Computer Environment

Figure 1:
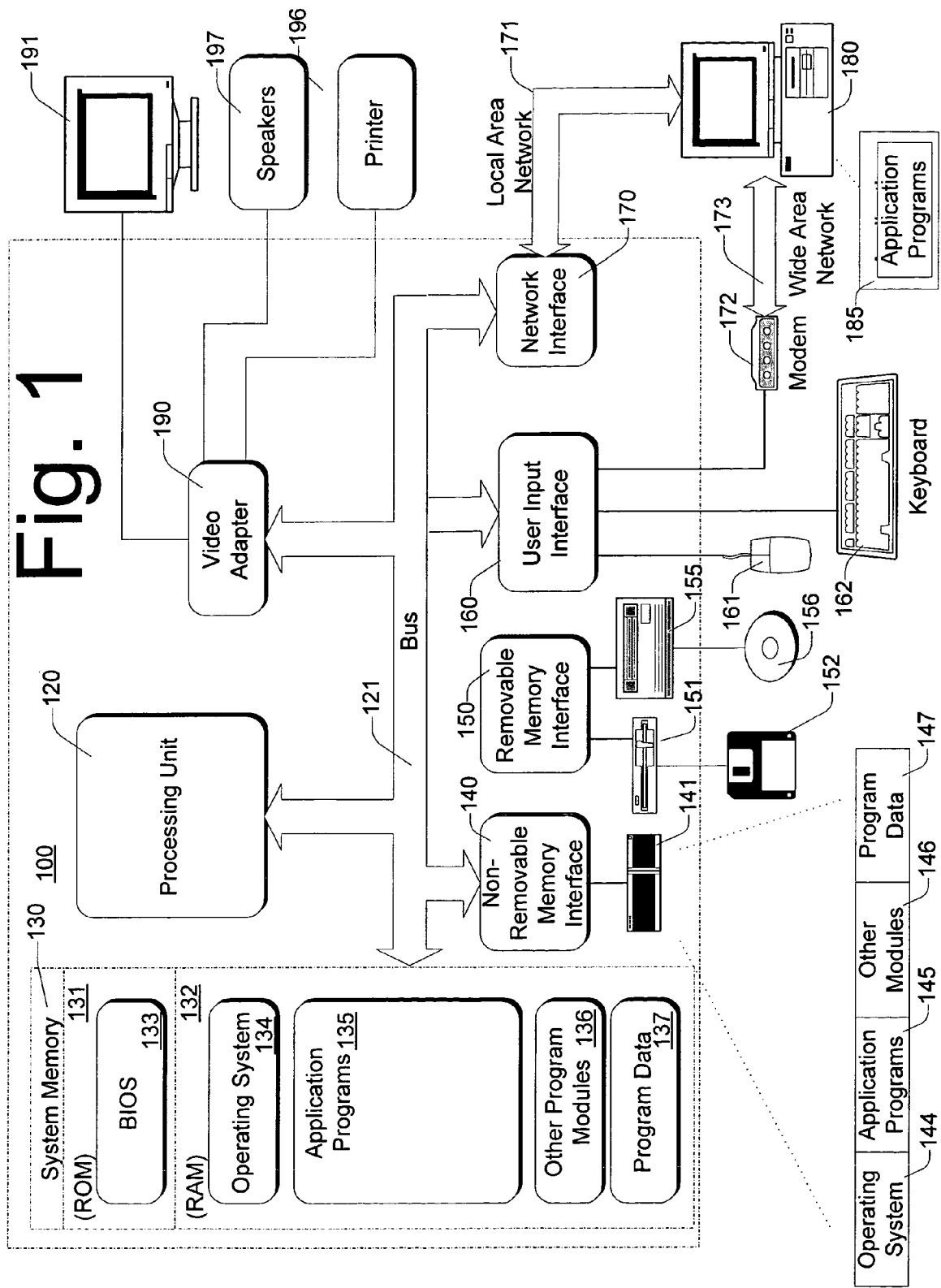
FIG. 1 is a block diagram of an exemplary computing environment in which various embodiments can be employed.

The various components and functionality described herein are implemented with a number of individual computers. FIG. 1 shows components of typical example of such a computer, referred to by reference numeral 100. The components shown in FIG. 1 are only examples, and are not intended to suggest any limitation as to the scope of the claimed subject matter; the claimed subject matter is not necessarily dependent on the features shown in FIG. 1. In addition, it will be appreciated and understood that the inventive embodiments can be thought of as pre-processing of data that is to be used in SVD computation.

A second aspect of the embodiments can be thought of as feeding this pre-processed data to a standard SVD processing machine. The pre-processing can be performed by various types of devices, such as the devices described in this section and other simple devices. In addition, the actual SVD computation can often also be performed by various computing devices and other simple devices or data processors, including very simple computing devices. For example, take the case of a simple digital camera. It is possible for a digital camera to take an image, represent it as a matrix, perform the pre-processing techniques described in this document, and then apply SVD to the matrix for purposes of identifying individuals in the picture. This can be done by comparing the low rank approximation to the current image with pre-stored training images provided at an earlier time. The camera can then take steps to place the image in an appropriate folder in the on-camera memory module. Thus, even simple devices can serve as an SVD processor.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs and DVD. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 1, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices which can be accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 1 provide storage of computer-readable instructions, data structures, program modules, and other data for computer 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 1 illustrates remote application programs 185 as residing on computer 180. It will be appreciated that the network connections shown are exemplary and other means of establishing a communications link between the computers may be used.

Singular Value Decomposition In General

Singular Value Decomposition or "SVD", as it will be referred to in this document, is a well known technique for processing data. The inventive embodiments described herein are intended to be used in connection with SVD techniques. However, before describing the inventive embodiments, some background on SVD techniques is given to assist the reader in understanding the environment in which the inventive embodiments are intended to operate.

SVD processing techniques are typically used in connection with large amounts of data. The data consists of points that "live" in a high dimensional space. For the purposes of the examples below, we will restrict the discussion to the case where the data lies in Euclidean space. Exemplary types of such high dimensional data can include, without limitation, image data, sound data, user preferences when they go shopping, polygon graphics, earthquake data, or oil exploration data. To be sure, the types of data with which the inventive embodiments can be used can vary widely and our techniques are completely general and independent of the data semantics. Moreover, the described techniques are applicable to space which is not necessarily Euclidean space.

SVD principles consider that there are some fixed axes in this Euclidean space, used so that numerical values can be assigned to the observed data. The goal of the SVD process is to seek a rotation and, perhaps, a rescaling of these axes so that the resulting set of axes describes the data better, i.e. it is a better fit for the data at hand. Put differently, SVD seeks a set of orthogonal directions in space along which the data varies the most. These directions then can be thought of as the new axes, and their scaling reflects their corresponding degree of variance.

For example, consider an object in the shape of a hot dog that resides in three dimensional space. In particular, the hot dog's center of gravity is assumed to coincide with the origin of our coordinate system, but is otherwise, i.e., rotationally, arbitrary. Assume also that the data of interest consists of a large number of points that lie on the surface of the hot dog and are spread roughly uniformly on that surface. One can now identify, one-by-one, the most important axes for this hot dog. For example, if one only had a single line to describe the hot dog, which line would it be? In accordance with the principles of SVD, the best line is the line that passes longitudinally through the center of the hot dog, as if one were to pass a skewer through it. That is, this is the line that captures the most information about the object.

Figure 2:
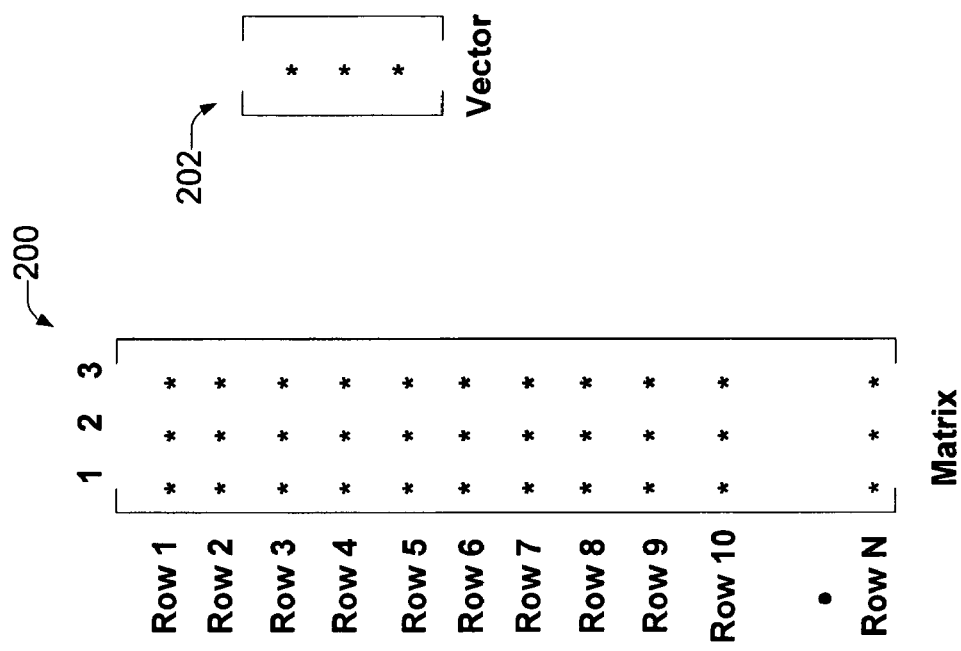
FIG. 2 is a diagram of an exemplary matrix and vector and is useful in understanding Singular Value Decomposition (SVD).

Mathematically, what this means is the following. The collection of points on the hot dog's surface can be organized into a matrix. An example matrix is shown in FIG. 2 at 200. There, matrix 200 has three columns (designated 1, 2, and 3) each of which represents a dimension. Since there are three dimensions in this example, there are three columns. Of course, there could be many more dimensions. Matrix 200 also has a large number of rows (designated Row 1 through Row N). There are as many rows in matrix 200 as there are points of interest on the surface of the hot dog. That is, each row corresponds to a point of interest in Euclidean space. Each row has three entries that represent the coordinates of that particular point in Euclidean space.

There is a theorem that provides as follows. If one starts with a vector, such as vector 202 in FIG. 2, having any triplet of numbers, and multiplies matrix 200 with the vector 202, the result is a new vector that is rotated somewhat and, perhaps, somewhat stretched. If one does this enough times, one will eventually get a vector disposed along the longitudinal axis of the hot dog. Observe that the mathematical operation of matrix multiplication, is equivalent to taking the dot product of the vector and each of the points in which one is interested.

So, in this example, one takes every point on the hot dog (i.e. every row in the matrix) and takes its dot product with a selected vector. Each dot product serves as a coordinate of the resulting vector. The goal of this processing is to find the vector 202 for which the sum of the squares of these new coordinates, i.e. of the dot products, is maximized. (Note that for this comparison to be fair we only compare among vectors of equal original length.) This process is aimed at finding the vector or direction in Euclidean space along which the sum of the squares of the projections (i.e. dot products) of the data is maximized. This is the direction in Euclidean space in which the vector captures as much information as possible about the data. Thus, the goal of this process is to find the single line in space such that when one projects their data onto that line, the sum of the squares of the projections is maximized.

The SVD technique can be viewed as repeating the following procedure:
(1) Find the vector v maximizing the projection of the data onto it;
(2) Project all the data onto the hyperplane perpendicular to v.
(3) Repeat (1) and (2).

Figure 3:
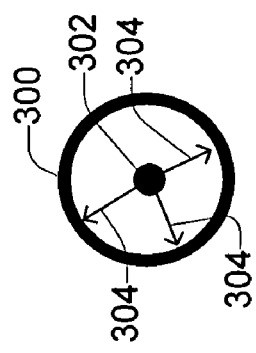
FIG. 3 is a diagram that is useful in understanding SVD.

In the case of the hot dog, what will happen is the following. We will find a vector v that is disposed along the longitudinal axis of the hot dog. Then we will find the plane (in general, i.e. in high-dimensions, the hyperplane) that is perpendicular to v and project the data onto that plane. What we will be left with is a three-dimensional object that has been projected into two dimensions. In this example, this essentially defines a ring, such as ring 300 in FIG. 3, which is shown in connection with vector 302 (which extends perpendicularly into and out of the plane of the page upon which FIG. 3 appears).

Now that there is a 2-dimensional object, SVD techniques can again be used to try to find the vector in two dimensional space that actually captures as much information as possible about ring 300. In this example, by virtue of the symmetry of ring 300, in fact all vectors in that plane work equally well, with example vectors being shown at 304.

The general idea, then, behind SVD processing is to process data in high dimensional space sufficient to find one or more axes along which meaningful information regarding the data can be gleaned.

In data mining applications, it is very often the case, that one does not want to select as many axes as the original dimensionality of the data provides. In fact, ideally, one wants to select much fewer axes and, at the same time, capture most of the information about the object.

The heart of the matter, from a computational standpoint, becomes how fast can one multiply the data (i.e. matrix) with an arbitrary vector. The SVD process reduces to applying this operation many many times.

Economies associated with the SVD process could readily be achieved by randomly eliminating data points from the data set. This amounts to eliminating entire rows of the matrix that describes the data set. It is reasonable to believe that if one can maintain an appropriate and rich enough sample of the original data (i.e. if there are enough points in the data set that were not eliminated), the SVD outcome could be not very different from the exact SVD outcome had none of the points been eliminated.

Our method completely avoids the problem of picking an appropriate sample, by maintaining all the data points, while perturbing them in a computationally beneficial manner. Crucially, we show how these perturbations can be chosen so that their effects nearly cancel with respect to the SVD computation. That is, while the perturbed data "looks" quite different from the original data, that difference is essentially imperceptible to the SVD algorithm. As a result, the perturbations have a minimal effect on the SVD outcome, while at the same time benefiting storage, transmission and speed of computation.

Modification of Individual Matrix Entries

In accordance with one embodiment, superior results are achieved by processing all of the entries of a given matrix, while modifying at least some of the entries in accordance with predefined criteria. In this embodiment, none of the rows are necessarily discarded. That is, it is not necessary in order for the superior results to be achieved that entire rows of the matrix be discarded. That is, all of the rows can be retained, albeit with entries that have been slightly modified in a manner that yields a computational advantage.

Figure 4:
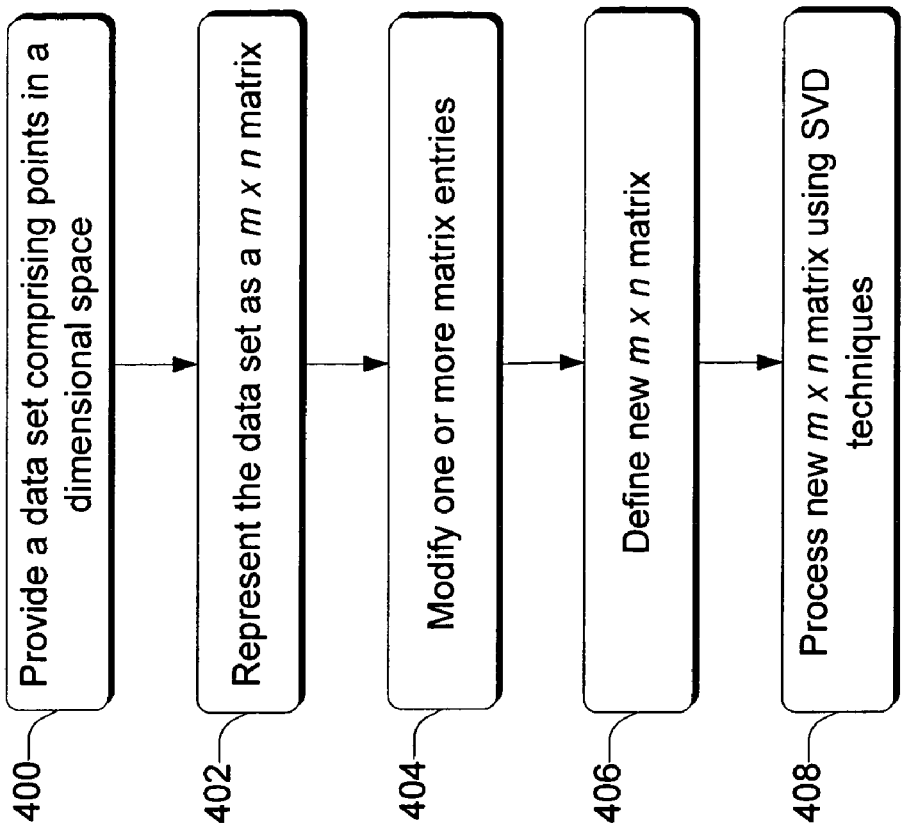
FIG. 4 is a flow diagram that describes steps in a method in accordance with one embodiment.

FIG. 4 is a flow diagram that describes steps in a method in accordance with one embodiment. The steps can be implemented in any suitable hardware, software, firmware or combination thereof.

Step 400 provides a data set comprising points residing in some space. Advantageously, that space can be high-dimensional. The data set can be provided in any suitable way using any suitable techniques. It is to be appreciated and understood, as pointed out above, that the inventive techniques described herein can be applied in a variety of environments and in connection with a variety of different technologies. As these environments and technologies can vary greatly from one another, so too can the manner in which data is provided. Typically, the data can provided via some type of measuring function where some type of object, phenomena, event or the like, is scientifically evaluated and measured for some purpose. Alternately, the data set can be provided as raw data that has already been measured or in some way ascertained.

Step 402 represents the data set as, or otherwise arranges the data set into a m×n matrix, where m represents the number of data points and n represents the dimensionality of the space in which the data points reside. Step 404 modifies one or more matrix entries. Examples of how various modifications can take place are given below in detail in the section entitled "Exemplary Modifications". Step 406 then defines a new m×n matrix that contains the modified matrix entries (and possibly unmodified matrix entries as will become apparent below). Step 408 then processes the new m×n matrix using SVD techniques. Any standard SVD techniques can be used and will be known by those of skill in the art.

Exemplary Modifications

Figure 5:
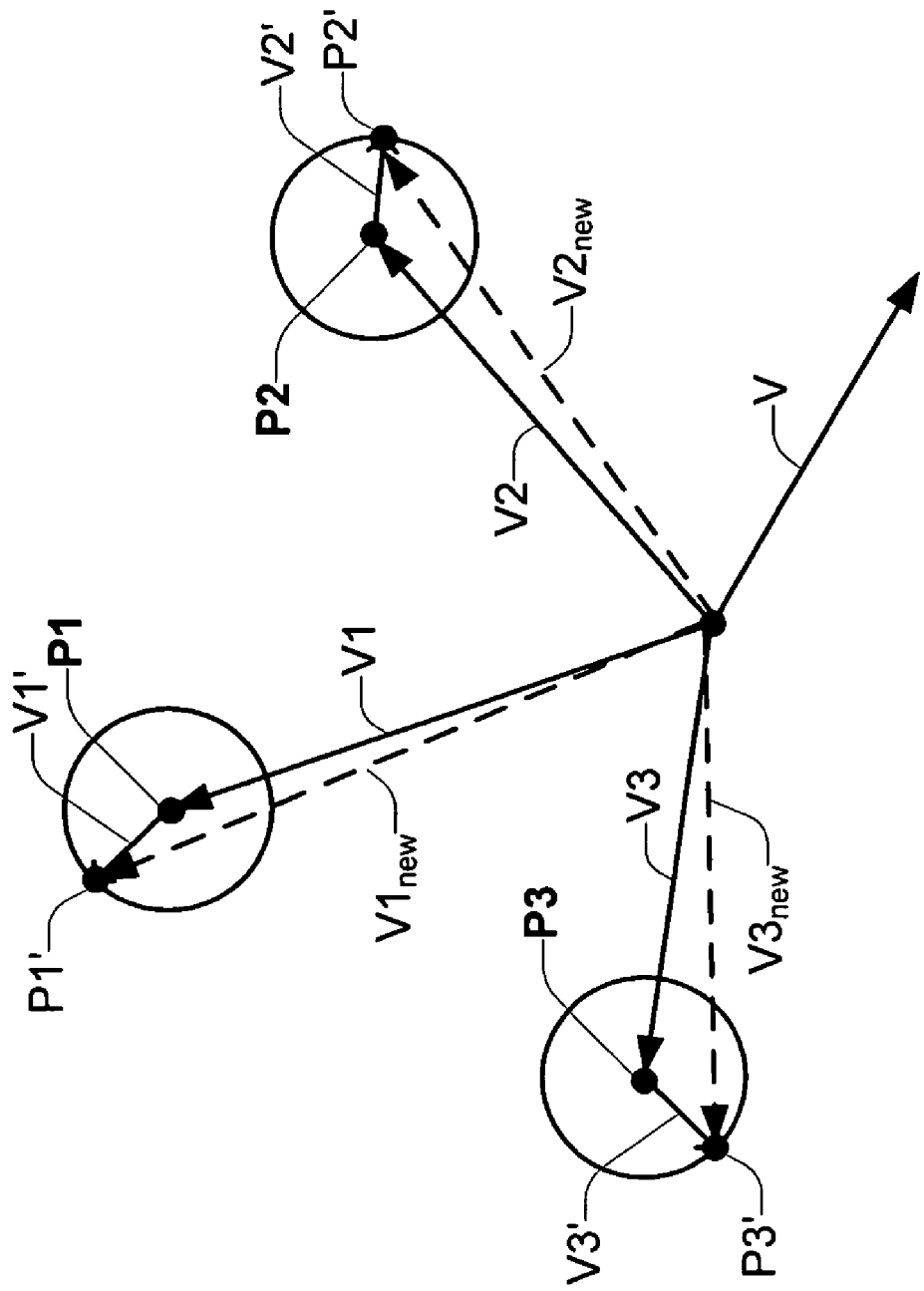
FIG. 5 is a diagram that is useful in understanding perturbation aspects of the described embodiments.

Consider FIG. 5 and the discussion below for an understanding of the principles behind how matrix entry modifications can take place.

Consider that points P1, P2, and P3 are the points of interest in a three dimensional Euclidean space. Consider also that vector V is the vector with which we desire to take a dot product. Each of the points P1, P2, and P3 define vectors V1, V2, and V3 respectively, which describe their coordinates in the Euclidean space. For each of the given points, imagine constructing a little sphere around it. Here, each sphere is represented as a circle. Where there are many points (as is typical), the spheres can and typically do overlap.

Now, for each point randomly select a point on its corresponding sphere and view this new random point as a replacement, an ersatz, of the original point. This amounts to a random perturbation of each point. In the illustrated example, each perturbation provides a new point P1', P2', P3' respectively, each of which is related to a perturbation vector V1', V2', and V3' respectively. Each perturbation defines a new vector relative to the original vector. For example, for vector V1, the new vector is shown as $V1_{new}$. The same can be said of vectors V2 and V3.

A crucial conceptual observation is that since we chose the new points randomly and independently, the perturbation vectors V1', V2', and V3' will come very very close to canceling each other out. As a result, if one uses SVD to compute the most important axes for the new set of points, $V1_{new}$, V2$_{new}$, V3$_{new}$, the outcome would be extremely close to the axes for the original set of points. Thus, to determine the most important vector, one would take each one of the perturbed points and take its dot product with vector V.

The purpose of the above thought-experiment is to provide the reader with an appreciation of the following. The result that is provided by using random perturbations (here spherically random) and applying SVD techniques is very close to the result that would be provided without random perturbations.

Now consider the following. The random perturbations discussed above do not need to be spherically random. That is, rather than actually placing a sphere (representing an infinite number of perturbation possibilities) around each of the points in space, the perturbation possibilities for each point can be reduced. In accordance with one embodiment, the reduced set of possible perturbations for each point is going to have both of the following characteristics:

1. The perturbation vectors cancel out perfectly; and
2. Most perturbation vectors are such that the resulting new vector contains many more 0s than the original vector.

With respect to the first characteristic, consider FIG. 6. There, a point P is shown together with its perturbation possibilities which are represented as an "x". Notice that, in this example we have chosen four perturbation possibilities for each point—one that is due east of point P, one that is due west of point P, one that is due north of point P, and one that is due south of point P. Clearly, these perturbation have average 0 for each point, and over a large data set, these perturbation possibilities, if randomly and independently selected, will tend to cancel one another out. An example of the second characteristic is given below in the section entitled "Sampling as a Modification".

Sampling as a Modification

In accordance with one embodiment, matrix entries can be processed using a sampling process that is directed to modifying one or more non-zero entries so that they become zero. This can be implemented in different ways.

In one implementation, a probability is used to ascertain whether to modify the value of an entry to zero or not. For example, consider that a probability is defined such that 50% of the time, an entry is modified to have a value of zero. This would be the same as flipping a coin. Accordingly, for each entry in each of the matrix's rows, half of the time the entry's value would be modified to equal zero and half of the time it would not.

This implementation can be mathematically expressed as follows:

Let A be any m×n matrix and let s≧1 be any number. Define A' to be a new m×n matrix where with probability 1/s we take A'(ij) to be equal to s×A(i,j) and with probability 1−1/s we take A'(i,j) to be equal to 0. Then with high probability, the low rank approximation to A offered by the optimal rank k approximation to A', i.e., A'$_k$, is very close to the optimal rank k approximation to the original matrix A, i.e., A$_k$.

A mathematically precise statement of the above is Theorem 1 in the paper entitled "Fast Computation of Low Rank Matrix Approximations" that comprises part of the Provisional Application that is incorporated by reference above. That theorem quantifies the relationship between s,m and n and the quality of the approximation offered by A'$_k$ (referred to as "very close" above) and also the relationship between s,m and n and the probability that A'$_k$ is indeed a good approximation (referred to as "with high probability" above).

In accordance with this embodiment, an original matrix A contains the data that is of interest. Matrix A would correspond to matrix 200 in FIG. 2. Matrix A is defined as a m×n matrix which means that there are m data points in an n dimensional space. The variable s represents a sampling rate which is selected to be greater than 1. So, for example, if one selected s=10, this means that, in the new matrix A', 1/s or $\frac{1}{10}^{th}$ of the original entries would be retained on average, while $\frac{9}{10}^{th}$ of the other entries would be modified to have a value of zero.

Each kept entry is multiplied by the sampling rate s. This has the effect of guaranteeing that the average of all perturbation vectors for each point (row in the matrix) is 0. To see this observe that for every entry (i,j), the corresponding perturbation A(i,j)−A'(i,j) equals A(i,j) with probability 1/s, when A'(i,j)=0, while with probability 1−1/s it equals −(s−1) A(i,j), when A'(i,j)=−sA(i,j).

We note that in practice, it is not necessary to multiply the kept entries by s in forming the matrix A'. Rather, we could simply keep the chosen entries, compute the SVD, and multiply the resulting matrix by s to get our low rank approximation A$_k$'. Also, we note that in practice one need not need to flip a separate coin for each entry in the original matrix in order to decide whether to keep that entry or not. Rather, using standard techniques, one can generate samples from the geometric distribution, telling them how many entries of the matrix to skip between successive chosen elements. Thus, the time taken to formulate the matrix A' is proportional to the non-zero entries that it contains, rather than the number of non-zero entries in A.

FIG. 7 is a flow diagram that describes steps in a method in accordance with one embodiment. The method can be implemented in any suitable hardware, software, firmware or combination thereof.

Step 700 establishes a relationship that defines one or more probabilities that pertain to whether values associated with a data set that can be represented as an m×n matrix are maintained or modified to zero. But one example of how this can be done is given above. There, a sampling rate can be selected and then used to establish the relationship. Step 702 processes multiple values in accordance with the defined probability or probabilities. This step can be implemented in any suitable way. For example, the step can be implemented in connection with a first matrix that has been defined to contain values or entries associated with the points in Euclidean space. Alternately, the step can be implemented as part of the data collection process. That is, this step can, for example, be implemented in simple, inexpensive hardware configured to process data as it is collected at the data collection end. The data, once processed by the hardware, can then be provided for further processing. It should be noted that this is one of the advantages of the described embodiments. That is, the described embodiments provide a simple yet powerful tool that need not necessarily be implemented after all of the data of a data set has been collected and formulated into a first matrix (such as matrix 200 in FIG. 2). That is, the preprocessing of the data can take a very large data set and process it to provide a much smaller data set which can then be transmitted much more easily over a network. This pre-processing can take place using a simple device at the data collection point. The simple device need not be a fully configured computer. For example, consider the case of a simple device such as a properly configured digital camera set up at a position where it is desirable to observe and ascertain whether certain individuals are wanted by law enforcement agencies. The camera can capture the images of various individuals and pre-process them to dramatically reduce the size of the images. The reduced-size images can then be provided via a network to a processing location for further analysis.

Step 704 forms a m×n matrix from the processed values. This matrix will have more zero entries than an original matrix that would have been defined by the original data set. This step can be implemented at different points in the data collection process. For example, the matrix formed by step 704 can be formed as the values are processed by step 702. Alternately, if an original matrix is first defined, the entire matrix can then be processed in accordance with step 702 to form a new matrix at 704. This is advantageous for a couple of different reasons. First, this reduces the computational complexity by providing a sparser (fewer non-zero entries) simpler data matrix. Second, the technique provides a desirable degree of compression which can assist in facilitating storage and transmission of the data.

Once the new matrix is formed, step 706 processes the formed matrix using SVD techniques.

Non-Uniform Sampling as a Modification

Notice in the FIG. 7 flow diagram that step 700 can establish one or more probabilities. In one embodiment, multiple probabilities can be established and used to implement a non-uniform sampling process. Recall that Theorem 1 essentially defines a uniform sampling process in which the probability of maintaining or modifying an entry value is fixed by a selected sampling rate which is standard across all entries values. This means that whatever probability is defined will be standardized across all entry values.

Consider now a relationship that is established by step 700 where the probabilities are defined such that it becomes more likely that larger entry values will be retained than smaller entry values. In this embodiment, non-uniform sampling can provide better results than uniform sampling. This aspect is discussed and mathematically described in the paper entitled "Fast Computation of Low Rank Matrix Approximations" that comprises part of the Provisional Application that is incorporated by reference above.

Quantization as a Modification

In accordance with one embodiment, matrix entries can be processed using a quantization process that is directed to modifying entries so that they have different values.

Assume, for simplicity, that the entries in an original matrix can assume any value between −1 and +1. Each entry in the matrix is processed in accordance with a defined probability. The outcome of the quantization process decides whether the processed entry gets replaced with either a −1 or a +1. In the described embodiment, the way this is done is the following. The closer the entry is to +1, the more likely it is to become +1. Likewise, the closer the entry is to −1, the more likely it is to become −1. So, at 0, there is an equal chance of conversion to +1 or −1. If an entry is +1 or −1 exactly, the entry will not be changed.

One benefit of the quantization process (or rounding to one of two values) is that although the number of entries in the matrix that are non-zero will stay the same as in the original matrix, now each entry can be represented by only a single bit which greatly facilitates processing speed. This, for example, represents a 32 to 64 factor of compression over standard floating point number representation. Naturally, one can generalize the rounding to a larger set of numbers than just two values, decrease error at the expense of using more bits to represent each datum.

This implementation can be mathematically expressed as follows:

Let A be any m×n matrix and let b be the entry with the largest absolute value in A. Define A' to be a new m×n matrix where with probability $1/2 + A(i,j)/(2b)$ we take $A'(i,j)$ to be equal to +b and with probability $1/2 - A(i,j)/(2b)$ we take $A'(i,j)$ to be equal to −b. Then with high probability, the low rank approximation to A offered by the optimal rank k approximation to A', i.e., $A'_k$, is very close to the optimal rank k approximation to the original matrix A, i.e., $A_k$.

A mathematically precise statement of the above is Theorem 2 in the paper entitled "Fast Computation of Low Rank Matrix Approximations" that comprises part of the Provisional Application that is incorporated by reference above. That theorem quantifies the relationship between b,m and n and the quality of the approximation offered by $A'_k$ (referred to as "very close" above) and also the relationship between b,m and n and the probability that $A'_k$ is indeed a good approximation (referred to as "with high probability" above).

In accordance with this embodiment, an original matrix A is taken and b is the maximum absolute value of all entries in the matrix. In the previous example, b was 1 because entries were between −1 and +1. The bracketed representation above describes how entry values are reassigned to either +b or −b with a defined probability. In the −1, +1 example, a new entry would be +1 with a probability of (1+entry value/b)/2. If entry value=+/−b, then the new entry value would remain the same.

Similarly to the case of sampling above, the use of b is not necessary in practice. Entries could be replaced by ±1 just as easily, enabling addition in place of multiplication, with a scaling of the final result by b.

FIG. 8 is a flow diagram that describes steps in a method in accordance with one embodiment. The method can be implemented in any suitable hardware, software, firmware or combination thereof.

Step 800 establishes a relationship that defines a probability that pertains to how values associated with a data set that can be represented as an m×n matrix are modified. But one example of how this can be done is given above. There, the maximum absolute value of the matrix entries (i.e. b) was used and a probability relationship was defined to establish how individual matrix entries are to be rounded between +b and −b.

Step 802 processes multiple values in accordance with the defined probability or probabilities. This step can be implemented in any suitable way. For example, the step can be implemented in connection with a first matrix that has been defined to contain values or entries associated with the points in Euclidean space. Alternately, the step can be implemented as part of the data collection process. That is, this step can, for example, be implemented in simple, inexpensive hardware configured to process data as it is collected at the data collection end. The data, once processed by the hardware, can then be provided for further processing. It should be noted that this is one of the advantages of the described embodiments. That is, the described embodiments provide a simple yet powerful tool that need not necessarily be implemented after all of the data of a data set has been collected and formulated into a first matrix (such as matrix 200 in FIG. 2).

Step 804 forms a m×n matrix from the processed values. This matrix will have entries that, in one implementation, are either +b or −b. This step can be implemented at different points in the data collection process. For example, the matrix formed by step 804 can be formed as the values are processed by step 802. Specifically, in many instances, one will know the scale in accordance with which the data is measured. For example, assume that the data that is being processed is digital music. Digital music data typically encodes numbers having values between −32,768 and +32,768. The sequence of data will fall within this range. Thus, rather than using the true maximums, one can use the bounds of this range for processing. Alternately, if an original matrix is first defined, the entire matrix can then be processed in accordance with step 802 to form a new matrix at 804.

Once the new matrix is formed, step 806 processes the formed matrix using SVD techniques.

It will be noted and appreciated that both sampling and quantizing can be used together on a data set and that their use on a data set is not mutually exclusive. In fact, in many different scenarios it will be advantageous to combine both the sampling and quantization techniques described above. There may, however, be some scenarios where one of the approaches is more advantageously employed than the other.

Exemplary Singular Value Decomposition (SVD) Processor

Figure 9:
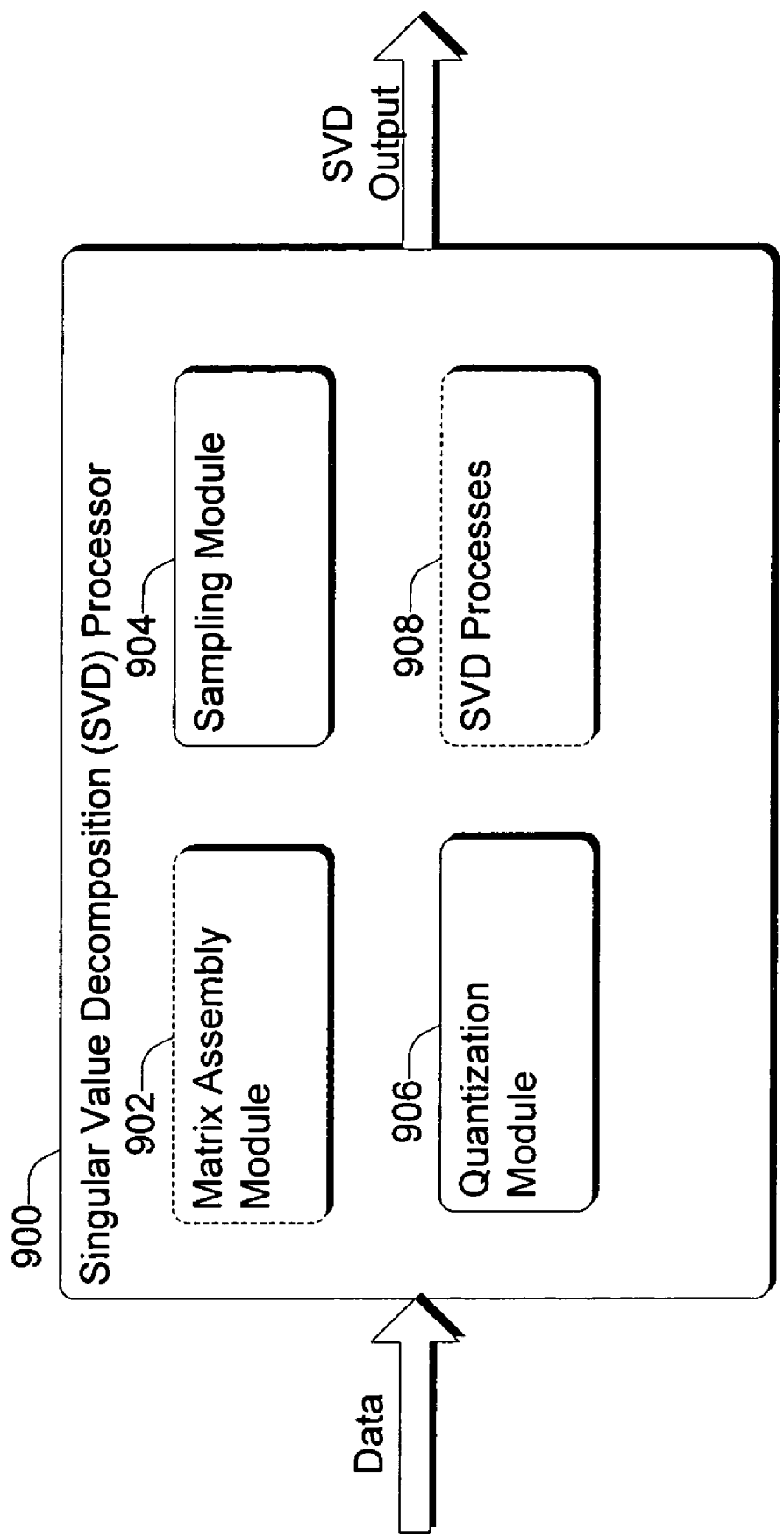
FIG. 9 is a block diagram of an exemplary SVD processor in accordance with one embodiment.

FIG. 9 shows an exemplary Singular Value Decomposition (SVD) Processor 900 in accordance with one embodiment. In the description that follows, different components are going to be described. It is to be appreciated and understood that the described components can be implemented together as an integrated unit, or separately as in a distributed fashion. That is, although all the individual components are shown as comprising SVD processor 900, such need not be the case. In addition, the SVD processor can be implemented in any suitable hardware, software, firmware, or combination thereof. Recall that in one advantageous embodiment, aspects of the processor, such as those that perform sampling and quantization, can be implemented in hardware at a data collection process. This can advantageously speed up the SVD computation process.

SVD processor 900 comprises, in this embodiment, a matrix assembly module 902, a sampling module 904, a quantization module 906, and an SVD process 908.

Matrix assembly module 902, which can be an optional module, functions to assemble data into a matrix and maintain the matrix during subsequent processing. For example, as data is received by the processor 900, the matrix assembly module 902 can process the data so that it is arranged in an m×n matrix having the characteristics described above. Module 902 can also maintain the matrix entries as the matrix is sampled and/or quantized. To that end, sampling module 904 is configured to sample individual matrix entries as described above, and quantization module 906 is configured to quantize the matrix entries as described above. Recall that sampling and quantizing can be performed separately in a mutually exclusive manner, or together.

Processor 900 can also, but need not necessarily include one or more SVD processes 908. The SVD processes function to perform SVD techniques on the data that is handed to it after the data is processed by the sampling and/or quantization modules.

It should be noted that in a distributed embodiment where the SVD processes 908 are not incorporated with the sampling and/or quantization modules, economies in data transmission are achieved due to the fact that a higher degree of data compression is achieved.

Conclusion

An advantageous innovation of the described embodiments is that, unlike all previous SVD methods, here, all data points are maintained, but in a perturbed state. This constitutes a noteworthy departure from methods that, for example, consider and dispose only entire rows and/or columns of the matrix at a time, corresponding to discarding entire points, or even entire original dimensions at a time. In this regard, the previous SVD methods can be considered to only sample the pertinent data, while the inventive techniques perturb the pertinent data. Moreover, because those perturbations are chosen randomly and independently they have the effect of making the data more computationally manageable while introducing a minimal amount of distortion.

Advantages of the described embodiments include the following. Assume that one wants to compute a low rank approximation of a given data set within a given amount of error. The inventive embodiments allow one to look at the data, process it as described above, and generate a much smaller package of data that, when processed by the SVD, gives nearly as good results as processing the entire data set. A noteworthy point is that the amount of preprocessing needed by our methods is only proportional to the amount of data kept and not the original amount of data.

The economies that are achieved by the above-described techniques flow as a natural consequence of the characteristics of the matrix arithmetic that is employed in the SVD process. Specifically, when one multiplies a matrix by a vector, as is repeatedly done to compute the SVD, the computation time is proportional to the number of non-zero entries. Thus, the more zeros there are in a matrix, the faster one can compute the dot product between all of the points and the current candidate vector. Similarly, the computation time is proportional to the number of bits required to represent each data point. Thus, the fewer bits required per entry, the faster one can compute the dot product between all of the points and the current candidate vector.

There are advantages that flow from this aspect and that can desirably impact the data collection process. Specifically, there are some important cases in which one is not able to gather data one row at a time, but rather one entry at a time. The inventive methods recognize that for each entry that is going to be a zero, one does not need to go out and collect that data. Thus, there are benefits to be achieved in data collection. Additionally, because of quantization, the actual measurements need only be very very rough because one is only keeping a single bit.

Thus, both sampling and quantization benefit the formulation of the data matrix, its storage (since we need to store less information), and its transmission (because fewer data takes less time to transmit). This also benefits SVD computation (fewer data to compute with, i.e., fewer non-zero entries and fewer bits per non-zero entry). In particular, the introduction of 0's allows us to exploit sparse matrix multiplication techniques, while the introduction of plus and minus 1's allows us to replace floating point operations with bit operations.

In addition, another benefit is that the process of sampling and quantization can be performed at the data collection end as noted above. In other words, the inventive techniques are so efficient that even a simple sensor in hardware can be equipped with sampling and/or quantization procedures and can apply the procedures as it is collecting the data before it pushes the data onto a network. This is beneficial over other techniques which actually need to "see" all of the data in order to decide which data to keep and which to discard.

Other advantages of the above-described embodiments will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system for processing data for use in Singular Value Decomposition (SVD), the system comprising:
   one or more computer-readable media;
   one or more processors; and computer-readable instructions on the computer-readable media which, when executed by the one or more processors, cause the one or more processors to implement a method comprising:
providing multiple entries that are associated with points in a space, the multiple entries being arrangable into a first m×n matrix;
modifying values of at least some of the entries by changing some of the values to zero and other values to non-zero values;
defining a second m×n matrix comprising the modified entries, the second m×n matrix being processed in accordance with Singular Value Decomposition techniques; and
storing the second m×n matrix after processing in accordance with Singular Value Decomposition techniques.

2. The system of claim 1, wherein the instructions further cause the one or more processors to, prior to modifying said values, arrange the multiple entries into the first m×n matrix.

3. The system of claim 2 further comprising prior to arranging the multiple entries, collecting a data set comprising said points in the space.

4. A system for performing Singular Value Decomposition (SVD) comprising:
one or more computer-readable media;
one or more processors; and
computer-readable instructions on the computer-readable media which, when executed by the one or more processors, cause the one or more processors to implement a method comprising:
processing a matrix containing entries associated with points in a space, the matrix having a number of rows, said processing comprising changing at least some non-zero entry values to zero and retaining the same number of rows in the matrix;
after said processing, performing Singular Value Decomposition on the matrix; and
storing the matrix after performing Singular Value Decomposition.

5. The system of claim 4, wherein said processing comprises changing at least some non-zero entry values to zero in accordance with a defined probability.

6. The system of claim 4, wherein said processing comprises changing at least some entry values to non-zero values.

7. The system of claim 4, wherein said processing comprises changing at least some entry values to non-zero values, wherein the non-zero values comprise plus or minus the absolute value of the largest matrix entry value.

8. The system of claim 4, wherein said processing comprises changing at least some entry values to non-zero values, wherein the non-zero values comprise plus or minus the absolute value of the largest matrix entry value, said processing comprising changing said at least some entry values to a non-zero value that is closest in accordance with a defined probability.

9. The system of claim 4, wherein said processing comprises:
changing at least some non-zero entry values to zero in accordance with a defined probability; and
changing at least some entry values to non-zero values, wherein the non-zero values comprise plus or minus the absolute value of the largest matrix entry value, said processing comprising changing said at least some entry values to a non-zero value that is closest in accordance with a defined probability.

10. A system for processing data for use in Singular Value Decomposition (SVD) to find an approximation for accelerating computational processing of high-dimensional data sets, the system comprising:
one or more computer-readable media;
one or more processors; and
computer-readable instructions on the computer-readable media which, when executed by the one or more processors, cause the one or more processors to implement a method comprising:
defining a first m×n matrix where m represents a number of points of interest in a space, and n represents number of dimensions in the space, each row of the matrix having multiple entries;
processing the first m×n matrix by mathematically perturbing values of at least some of the multiple entries by randomly perturbing the values such that for each point, the potential perturbations cancel out;
defining a second m×n matrix, wherein the second m×n matrix is defined as the multiple entries of the first m×n matrix are processed such that the second m×n matrix that contains entries having values that have been perturbed;
processing the second m×n matrix in accordance with SVD techniques; and
storing the second m×n matrix after processing in accordance with SVD techniques.

11. The system of claim 10, wherein said mathematically perturbing comprises perturbing the values such that a plurality of the values become 0.

12. A system for processing data for use in Singular Value Decomposition (SVD), the system comprising:
one or more computer-readable media;
one or more processors; and
computer-readable instructions on the computer-readable media which, when executed by the one or more processors, cause the one or more processors to implement a method comprising:
providing multiple entries that are associated with points in a space, the multiple entries being arrangable into a first m×n matrix where m represents the number of points of interest in the space, and n represents the number of dimensions in the space, each row of the matrix having multiple entries;
processing the first m×n matrix by mathematically randomly perturbing the values of at least some of the multiple entries, wherein said perturbing comprises perturbing the values so that at least some of the values are zero;
defining a second m×n matrix that contains entries having values that have been perturbed, the second m×n matrix being processed in accordance with SVD techniques; and
storing the second m×n matrix after processing in accordance with SVD techniques.

13. The system of claim 12, wherein the instructions further cause the one or more processors to process the second m×n matrix in accordance with SVD techniques.

14. The system of claim 12, wherein said perturbing comprises perturbing the values so that at least some of the values are changed to non-zero values.

15. A system for processing data for use in Singular Value Decomposition (SVD), the system comprising:
one or more computer-readable media;
one or more processors;

computer-readable instructions on the computer-readable media which, when executed by the one or more processors, cause the one or more processors to implement a method comprising:
  establishing a relationship that defines one or more probabilities that pertain to whether values associated with a data set that can be represented as an m×n matrix are set to zero;
  processing multiple values associated with said data set in accordance with said one or more probabilities, at least some of the values being set to zero;
  storing the multiple values associated with said data set after processing in accordance with said one or more probabilities; and
  arranging the multiple values into a second m×n matrix, wherein the second m×n matrix is processed using SVD techniques.

16. The system of claim 15, wherein said establishing comprises selecting a sampling rate and defining said one or more probabilities as a function of the sampling rate.

17. The system of claim 15, wherein said processing comprises doing so in connection with a data collection process.

18. A system for processing data for use in Singular Value Decomposition (SVD), the system comprising:
  one or more computer-readable media;
  one or more processors;
  computer-readable instructions on the computer-readable media which, when executed by the one or more processors, cause the one or more processors to implement a method comprising:
    establishing a relationship that defines one or more probabilities that pertain to whether values associated with a data set that can be represented as an m×n matrix are modified to zero, said one or more probabilities making it more likely that larger entry values will be retained than smaller entry values;
    processing multiple values associated with said data set in accordance with said one or more probabilities, at least some of the values being set to zero;
    storing the multiple values associated with said data set after processing in accordance with said one or more probabilities; and
    arranging the multiple values into a second m×n matrix, wherein the second m×n matrix is processed using SVD techniques.

19. The system of claim 18, wherein said processing comprises doing so in connection with a data collection process.

20. A system for processing data for use in Singular Value Decomposition (SVD), the system comprising:
  one or more computer-readable media;
  one or more processors; and
  computer-readable instructions on the computer-readable media which, when executed by the one or more processors, cause the one or more processors to implement a method comprising:
    establishing a relationship that defines a probability that pertains to how values associated with a data set that can be represented as an m×n matrix are to be modified;
    processing multiple values associated with the data set in accordance with the probability to provide values that have been modified;
    storing the multiple values associated with the data set after processing in accordance with the probability; and
    processing the modified values using SVD techniques.

21. The system of claim 20, wherein:
  said establishing comprises finding a value b that corresponds to the largest absolute value of values associated with the data set; and
  said processing comprises setting each of the multiple values to either +b or −b in accordance with the one or more probabilities.

22. The system of claim 21, wherein said one or more probabilities make it such that the closer an individual value of said multiple values is to +b or −b, the more likely it is that said individual value will be set to +b or −b respectively.

23. The system of claim 20, wherein said instructions further cause the one or more processors to, prior to processing said modified values using SVD techniques, arrange said modified values in a second m×n matrix, said processing of the modified values comprising processing said second m×n matrix.

24. A system for processing data for use in Singular Value Decomposition (SVD), the system comprising:
  one or more computer-readable media;
  one or more processors;
  computer-readable instructions on the computer-readable media which, when executed by the one or more processors, cause the one or more processors to implement a method comprising:
    receiving multiple entries that are associated with points in a space, the multiple entries being arrangable into a first m×n matrix;
    modifying values of at least some of the entries, wherein said modifying comprises changing at least some of the values to non-zero values;
    providing said multiple entries, including any modified entries, to an SVD processor for processing in accordance with Singular Value Decomposition techniques, said multiple entries, including any modified entries, being arrangable into a second m×n matrix; and
    storing the second m×n matrix after processing in accordance with Singular Value Decomposition techniques.

25. The system of claim 24, wherein said modifying comprises changing at least some of the values to zero.

* * * * *